(12) United States Patent
Rawls

(10) Patent No.: US 11,033,837 B2
(45) Date of Patent: Jun. 15, 2021

(54) FEEDWELL HAVING TWISTED PLATES

(71) Applicant: Andritz Inc., Glens Falls, NY (US)

(72) Inventor: Lindsay Brandino Rawls, Atlanta, GA (US)

(73) Assignee: ANDRITZ INC., Alpharetta, GA (US)

( * ) Notice: Subject to any disclaimer, the term of this patent is extended or adjusted under 35 U.S.C. 154(b) by 539 days.

(21) Appl. No.: 15/659,441

(22) Filed: Jul. 25, 2017

(65) Prior Publication Data

US 2018/0036656 A1 Feb. 8, 2018

Related U.S. Application Data

(60) Provisional application No. 62/369,947, filed on Aug. 2, 2016.

(51) Int. Cl.
*B01D 21/00* (2006.01)
*B01D 21/08* (2006.01)
(Continued)

(52) U.S. Cl.
CPC ...... *B01D 21/2411* (2013.01); *B01D 21/0042* (2013.01); *B01D 21/0087* (2013.01);
(Continued)

(58) Field of Classification Search
CPC ............ B01D 21/0042; B01D 21/0087; B01D 21/06; B01D 21/08; B01D 21/2405;
(Continued)

(56) References Cited

U.S. PATENT DOCUMENTS 6,174,434 B1  1/2001  Krofta
7,547,396 B2  6/2009  Foreman et al.
(Continued)

FOREIGN PATENT DOCUMENTS

EP       2716342      4/2014
WO    2007/061599    5/2007
(Continued)

OTHER PUBLICATIONS

Garcia Alonso, Nuria, Extended European Search Report, dated Dec. 20, 2017, pp. 1-7, EPO, Munich, Germany.
(Continued)

*Primary Examiner* — Patrick Orme
(74) *Attorney, Agent, or Firm* — Kilpatrick Townsend & Stockton LLP

(57) ABSTRACT

A feedwell design for a clarifier that may better dissipate the entrance energy of feed slurry liquid exiting the feedwell and entering the clarifier. Plates having a surface area twisted around a longitudinal axis may be provided at the bottom of the feedwell. The plates may cause a change in the flow direction of the feed, from being mostly horizontal to mostly vertical, to slow the slurry. The provision of plates at the bottom of a feedwell in a clarifier may advantageously reduce the velocity of the materials entering the clarifier, or may increase the uniformity of the flow rate of the materials while reducing or maintaining the amount of shear force, turbulence, or other forces that may have a detrimental effect on clarification. Likewise, this may improve the rate at which solids settle out of the feed slurry solution, and thus improve the clarity of the removed liquid.

20 Claims, 11 Drawing Sheets

(51) Int. Cl.
    *B01D 21/24*     (2006.01)
    *B01D 21/06*     (2006.01)

(52) U.S. Cl.
    CPC ............. *B01D 21/06* (2013.01); *B01D 21/08* (2013.01); *B01D 21/2427* (2013.01); *B01D 21/2444* (2013.01)

(58) Field of Classification Search
    CPC ............ B01D 21/2411; B01D 21/2416; B01D 21/2427; B01D 21/2444
    See application file for complete search history.

(56) References Cited

U.S. PATENT DOCUMENTS

| | | |
|---|---|---|
| 8,021,559 B2 | 9/2011 | Triglavcanin |
| 2004/0226880 A1 | 11/2004 | Brown et al. |
| 2010/0187191 A1 | 7/2010 | Triglavcanin |
| 2011/0079563 A1* | 4/2011 | Triglavcanin ...... B01D 21/2411 210/800 |
| 2014/0091049 A1* | 4/2014 | Brandino ........... B01D 21/2427 210/801 |

FOREIGN PATENT DOCUMENTS

| | | |
|---|---|---|
| WO | 2009/137865 | 11/2009 |
| WO | 2010097762 | 9/2010 |
| WO | 2012080931 | 6/2012 |

OTHER PUBLICATIONS

Franchino, Alejandro Milies, Chilean patent application office action, dated Mar. 12, 2019, pp. 1-10, Santiago, Chile.
Nuria, Garcia Alonso; European Patent Application Office Action dated Apr. 16, 2020, pp. 1-2.
Nuria, Garcia Alonso; European Patent Office Extended Search Report dated Dec. 12, 2017, pp. 1-7.

* cited by examiner

FEEDWELL HAVING TWISTED PLATES

CROSS-RELATED APPLICATION

This application claims the benefit of U.S. Provisional Pat. App. No. 62/369,947 filed on Aug. 2, 2016, the entirety of which is incorporated herein by reference.

BACKGROUND OF THE INVENTION

1. Technical Field

The present disclosure relates generally to clarifiers configured to separate lighter substances from heavier substances in the mineral processing, pulp and paper, water treatment, and waste treatment industries, and particularly to feedwells used in the mineral processing, pulp and paper, water treatment, and waste treatment industries.

2. Related Art

Facility operators use clarifiers in the pulp and paper industry and other industries to separate mixtures. Typically, the clarifier is a large holding tank or vessel. Operators pump fluid mixtures into the clarifier and allow gravity separation to occur. That is, if left undisturbed, suspended particles eventually settle out of the solution. Once sufficiently separated, operators may extract each substance.

For example, in the pulp and paper industry, re-causticizing plant operators might use clarifiers in the chemical recovery and re-causticizing process. This process converts sodium carbonate ($Na_2CO_3$), a byproduct of chemical pulping, to sodium hydroxide (NaOH). Sodium hydroxide together with sodium sulfide ($Na_2S$) are "white liquor" components in the Kraft chemical pulping process.

To produce pulp with the Kraft process, mill operators add white liquor to piles of lignocellulosic material in a large treatment vessel known as a digester. The lignocellulosic material is commonly, but is not always, wood chips. The sodium hydroxide and sodium sulfide react with compounds in the lignocellulosic material to separate chemically cellulosic fibers and other carbohydrates from lignin protein. Operators then further process the cellulosic fibers to produce paper-grade pulp, or other cellulose-based products. While sodium hydroxide is reasonably abundant, the costs of producing pulp and paper would quickly become prohibitive if manufactures did not recover and recycle this chemical compound.

The chemical recovery process begins with collecting the reacted liquor from the digester. Once white liquor reacts with the lignocellulosic material in the digester, the liquor becomes "black liquor." This black liquor contains dissolved organic and inorganic compounds. Some of these compounds can be reconverted into sodium hydroxide and other useful products. However, newly formed black liquor is generally too dilute for efficient chemical recovery. To address this, operators generally flash evaporate excess liquid from the black liquor to concentrate the dissolved solids. Once sufficiently concentrated, the operators pyrolyse the black liquor in a chemical recovery boiler. The pyrolyzed inorganic compounds collect at the bottom of the recovery boiler in a molten smelt and gradually flow down an adjoining smelt spout into a nearby dissolving tank.

The dissolving tank is a holding tank and generally contains water or weak wash. The smelt creates "green liquor" (so called due to its green color) when the smelt contacts the water or weak wash. The green liquor contains sodium carbonate, a reactant that can be converted back into sodium hydroxide. To isolate sodium carbonate from the green liquor, operators pump the green liquor into a clarifier. The clarifier functions as a large settling tank. The insoluble "dregs" and other solids settle out of the solution and collect at the bottom of the clarifier. In this example, the dregs and other solids are commonly heavier inorganic compounds and unburned carbon.

Operators then pump the clarified green liquor containing sodium carbonate from the top of the clarifier before treating the sodium carbonate with lime (calcium oxide, CaO). The lime reacts with the sodium carbonate in an aqueous solution to convert the sodium carbonate back into sodium hydroxide, calcium carbonate, and other byproducts. The lime-treated green liquor can then be further clarified to isolate the sodium hydroxide. The dregs containing calcium carbonate and other byproducts can likewise be further refined and clarified.

As this example illustrates, clarifiers tend to be used in processes that separate and collect heavier solids from a liquid solution. Clarifiers may be used in the mineral processing, pulp and paper, water treatment, waste treatment, waste water treatment, and other industries that require such mixture separation.

To maintain steady production, it can be desirable to introduce feed slurry into the feedwell continuously while continuously siphoning off clarified liquid from the top of the clarifier. To process material efficiently and to avoid premature settling, operators tend to pump feed slurry into the feedwell at a high velocity. The feedwell may dissipate the entrance energy of the incoming feed slurry such that the feed slurry enters the settling zone as a plug flow. A "plug flow" refers to a flow with a substantially constant velocity across a given area.

Previous attempts to promote plug flow involved using feedwells with vertically oriented plates such as the vanes disclosed in WO 2007/061599 and WO 2009/137865. However, these feedwell designs do not sufficiently dissipate the entrance energy or reduce the velocity inside the clarifier. Further, even in cases where the velocity is reduced, turbulence and shear force may be increased. Turbulence or shear force present in the clarifier may also have a detrimental effect on the ability of solids to settle out of the mixture. Thus, in certain existing clarifier feedwells, the solids in the feed slurry may not sufficiently settle out, and the clarity of the separated or removed liquids (e.g., the clarified liquids) may suffer.

SUMMARY OF THE INVENTION

The problem of incomplete mixture separation in a clarifier is mitigated by using a feedwell in accordance with the present disclosure. Without being bounded by theory, the embodiments described herein may reduce the velocity of the feed slurry flow in the feedwell without increasing turbulence or shear force. In one exemplary embodiment, the feedwell may comprise twisted plates disposed at or near the bottom of the feedwell. The twisted plates may be disposed such that a leading face of the twisted plates is positioned to oppose the general direction of feed slurry movement in the feedwell. That is, the leading face can be configured to face the incoming feed slurry. An exemplary twisted plate may be twisted about a longitudinal axis extending from a first end to a second end, the second end being distally disposed from the first end. The first end of the twisted plate may engage a ring disposed within the feedwell, or near the bottom of the feedwell. In other exemplary embodiments, the ring may be absent. The second end of the twisted plate may extend toward an inner surface of a sidewall, wherein the sidewall may define the body of the feedwell. The center of the ring may be disposed coaxially with a vertical line extending though the feedwell. The first end of the twisted plate has a first slope as measured on a two-dimensional Cartesian plane. The first end of the twisted plate may engage the exterior surface of the ring at an initial angle, wherein the initial angle is the angle between the first end and a vertical line extending through the feedwell. The second end of the twisted plate can be longer than the first end. As a result, the surface area of the twisted plate's leading face may generally increase from the first end to the second end in embodiments in which the second end is longer than the first end. The leading face's surface area may be defined by the area between a first edge of the first end, a first edge of the second end, a first top edge of the top side, and a first bottom edge of the bottom side of the twisted plate, in which the twisted plate is configured to oppose the general flow direction of the feed slurry. The second end may have a final slope as measured on a two-dimensional Cartesian plane. The final slope may be shallower than the first slope. The height of the exemplary twisted plates can remain substantially constant while the volume of the twisted plates gradually increases from the first end to the second end. In other exemplary embodiments, the height of the twisted plates may increase or decrease from the first end to the second end. In still other exemplary embodiments, the surface area of the leading face of the twisted plates may remain substantially constant as measured from the first end to the second end of the twisted plates.

Intermediate slopes disposed between the first slope and the final slope may gradually decrease from the first end to the second end. In certain exemplary embodiments, the intermediate slopes decrease continuously between the first slope and the final slope. In other exemplary embodiments, the intermediate slopes may decrease at intervals between the first slope and the final slope. The first end of the twisted plate can be offset angularly from the second end of the twisted plate as measured on a two-dimensional Cartesian plane. In other exemplary embodiments, the twisted plates may be curved.

Unless otherwise stated, the vertical axis of the reference two-dimensional Cartesian plane disclosed herein corresponds to a vertical line extending through the feedwell. Both the Cartesian plane's vertical axis and horizontal axis can be perpendicular to a longitudinal axis extending from the first end of the twisted plate, through the twisted plate, to the second end of the twisted plate. In certain exemplary embodiments, the twisted plate's longitudinal axis may be disposed parallel to a radial line extending from the center of the feedwell to the inner surface of the sidewall. In other exemplary embodiments, a twisted plate's longitudinal axis may be disposed parallel to a tangential line extending from a ring, hollow shaft, or opening defined by the first end of multiple plates (e.g. multiple twisted plates) to the sidewall.

In other exemplary embodiments, multiple twisted plates may be further arrayed in a spiral configuration around the ring. In this exemplary embodiment, the top side of a twisted plate may be curved and the bottom side of the twisted plate may be curved. In further exemplary embodiments, the twisted plates may be disposed at an angle relative to a radial line extending from the center of the feedwell to the sidewall. In still further exemplary embodiments, a twisted plate may be disposed at an angle relative to a tangent line extending from the ring hollow shaft, or opening defined by the first end of multiple plates (e.g. multiple twisted plates) to the sidewall. The angle may be a vertical angle, a horizontal angle, or a combination of a vertical and horizontal angle.

The embodiments described herein may be used with a flow of feed slurry to increase the rate at which solids settle out of the feed slurry, and thereby improve the clarity of the removed liquid.

It is further contemplated that the embodiments described herein may reduce the entrance energy of incoming feed slurry, without substantially increasing turbulence or shear force.

The embodiments disclosed herein may be used in the separation of liquid(s) and solid(s) from feed slurry materials or the like. In certain exemplary embodiments, a feedwell described herein may sufficiently dissipate the entrance energy of the total flow of the feed slurry (e.g., of the mixture of inlet liquid and solid materials) into a clarifier such that the total flow enters a settling zone as a plug flow. (e.g., such that the velocity of the feed slurry mixture is substantially constant across any cross-section of the area of the flow perpendicular to the axis of the flow). This reduced or substantially uniform or constant velocity may enable any solids in the feed slurry to settle out of the mixture more quickly or more easily than in situations where the velocity of the feed slurry entering the feedwell is inconsistent or too high. This improved "settling out" may in turn improve the clarity of the liquid that is ultimately separated or removed from the clarifier.

BRIEF DESCRIPTION OF THE DRAWINGS

The foregoing will be apparent from the following more particular description of exemplary embodiments of the disclosure, as illustrated in the accompanying drawings. The drawings are not necessarily to scale, with emphasis instead being placed upon illustrating the disclosed embodiments.

DETAILED DESCRIPTION OF THE INVENTION

Figure 1:
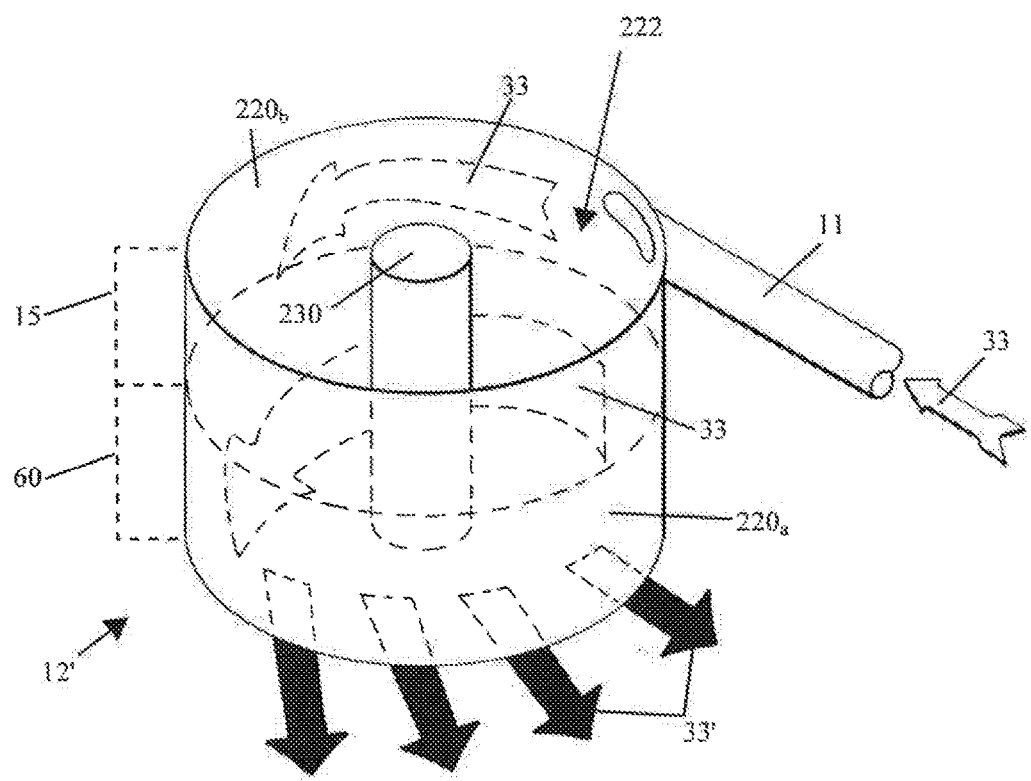
FIG. 1 illustrates a conventional-style single tangential inlet feedwell.

The following detailed description of the preferred embodiments is presented only for illustrative and descriptive purposes and is not intended to be exhaustive or to limit the scope and spirit of the invention. The embodiments were selected and described to best explain the principles of the invention and its practical application. One of ordinary skill in the art will recognize that many variations can be made to the invention disclosed in this specification without departing from the scope and spirit of the invention.

Similar reference characters indicate corresponding parts throughout the several views unless otherwise stated. Although the drawings represent embodiments of various features and components according to the present disclosure, the drawings are not necessarily to scale and certain features may be exaggerated in order to better illustrate embodiments of the present disclosure, and such exemplifications are not to be construed as limiting the scope of the present disclosure.

Except as otherwise expressly stated herein, the following rules of interpretation apply to this specification: (a) all words used herein shall be construed to be of such gender or number (singular or plural) as to circumstances require; (b) the singular terms "a," "an," and "the," as used in the specification and the appended claims include plural references unless the context clearly dictates otherwise; (c) the antecedent term "about" applied to a recited range or value denotes an approximation within the deviation in the range or values known or expected in the art from the measurements; (d) the words "herein," "hereby," "hereto," "hereinbefore," and "hereinafter," and words of similar import, refer to this specification in its entirety and not to any particular paragraph, claim, or other subdivision, unless otherwise specified; (e) descriptive headings are for convenience only and shall not control or affect the meaning or construction of any part of the specification; and (f) "or" and "any" are not exclusive and "include" and "including" are not limiting. Further, the terms, "comprising," "having," "including," and "containing" are to be construed as open-ended terms (i.e., meaning "including but not limited to").

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

To the extent necessary to provide descriptive support, the subject matter and/or text of the appended claims is incorporated herein by reference in their entirety.

Recitation of ranges of values herein are merely intended to serve as a shorthand method of referring individually to each separate value falling within the range of within any sub ranges there between, unless otherwise clearly indicated herein. Each separate value within a recited range is incorporated into the specification or claims as if each separate value were individually recited herein. Where a specific range of values is provided, it is understood that each intervening value, to the tenth or less of the unit of the lower limit between the upper and lower limit of that range and any other stated or intervening value in that stated range or sub range hereof, is included herein unless the context clearly dictates otherwise. All subranges are also included. The upper and lower limits of these smaller ranges are also included therein, subject to any specifically and expressly excluded limit in the stated range.

It should be noted that some of the terms used herein are relative terms. For example, the terms "upper" and "lower" are relative to each other in location, i.e. an upper component is located at a higher elevation than a lower component in a given orientation, but these terms can change if the device is flipped. The terms "inlet' and "outlet" are relative to a fluid flowing through them with respect to a given structure, e.g. a fluid flows through the inlet into the structure and flows through the outlet out of the structure. The terms "upstream" and "downstream" are relative to the direction in which a fluid flows through various components, i.e. the flow of fluids through an upstream component prior to flowing through the downstream component.

The terms "horizontal" and "vertical" are used to indicate direction relative to an absolute reference, i.e. ground level. However, these terms should not be construed to require structure to be absolutely parallel or absolutely perpendicular to each other. For example, a first vertical structure and a second vertical structure are not necessarily parallel to each other. The terms "top" and "bottom" or "base" are used to refer to locations/surfaces where the top is always higher than the bottom/base relative to an absolute reference, i.e. the surface of the Earth. The terms "upwards" and "downwards" are also relative to an absolute reference; an upwards flow is always against the gravity of the Earth.

Figure 3:
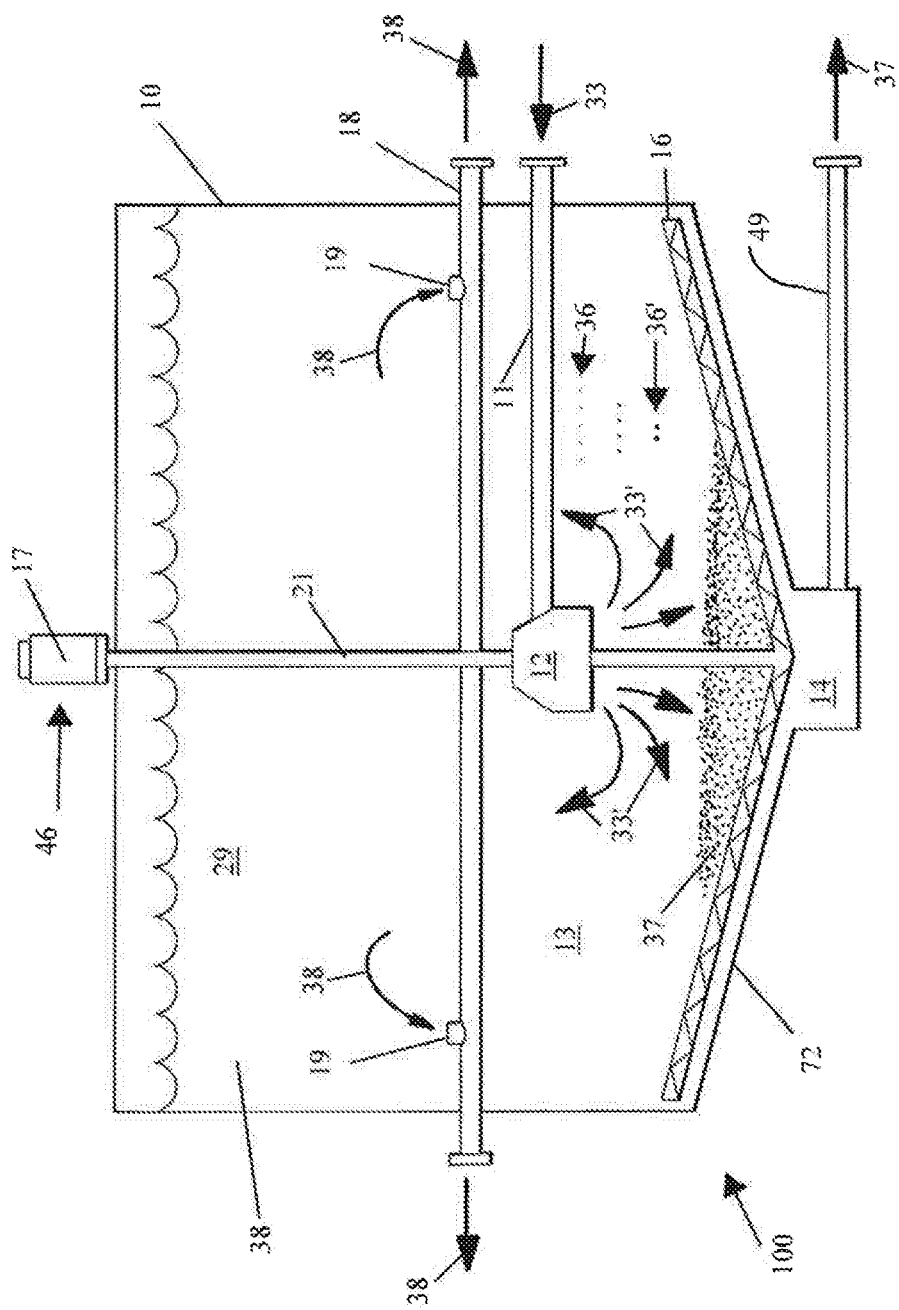
FIG. 3 is a side cross sectional view of a clarifier and feedwell.

FIG. 3 illustrates a clarifier 100. Clarifiers 100 generally comprise a tank 10 having a sloped floor 72 leading to a center well 14. The settled solids 37 generally flow out of an outlet 49 in the center well 14. Either a bustle pipe 18 or an overflow weir (not depicted) may be used for removing the clarified liquid 38. The initial comingled mixture of light liquids and heavier solids is known in the paper industry as "feed slurry" 33. The feed slurry 33 flows through the inlet 11 and enters the clarifier 100 through a submerged feedwell 12. The feedwell 12 may be positioned at the center of the clarifier tank 100. The area below the feedwell 12 is the settling zone 13, i.e. the area where the heavier flocculated solids 36' settle out of solution 33'. In installations with a bustle pipe 18, the area above the bustle pipe 18 is a storage area 29 for the clarified liquid 38. Clarified liquid 38 from storage area 29 may then enter the bustle pipe 18 through one or more holes 19. The bustle pipe 18 transfers the clarified liquid 38 out of the tank 10. Tanks 10 with an overflow weir generally do not have a storage zone because the clarified liquid 38 flows over the weir for downstream collection.

Clarifiers 100 may also have a drive assembly 46 having a motor 17 and a rake shaft 21 to turn a submerged rake mechanism 16. The feedwell 12 can be centered on the rake shaft 21. The rake shaft 21 extends through a ring, a hollow shaft, or an opening (230 in FIG. 1) disposed within the feedwell 12, thereby allowing the rake shaft 21 to rotate freely. As the solids 37 accumulate, a rake 16 moves the settled solids 37 toward the center well 14 at the bottom of the clarifier 100 for removal. From the center well 14, the settled solids 37 are collected and pumped through the outlet 49 for further downstream processing or disposal.

As solid particles 36 fall toward the bottom of the clarifier 100, the particles 36 begin to stick together i.e. to flocculate. The flocculated solids 36' are heavier than the surrounding solution 33' and therefore tend to settle out of the solution 33' more quickly than smaller particles. Depending on the processes, operators may add flocculent to attract solid particles 36 and accelerate this process.

In general, there are two main classical designs for feedwells 12 used in clarifiers 100. FIG. 1 shows single entry feedwell 12' (e.g., as described in U.S. Pat. No. 8,021,559 and U.S. Pat. App. No. 2011/0079563). The feed slurry 33 enters the feedwell 12 through an inlet 11 at a tangent to the inner sidewall surface $220_b$ of feedwell 12. The inlet 11 introduces the feed slurry 33 to an upper zone 15. The inner sidewall surface $220_b$ is oppositely disposed from the outer sidewall surface $220_a$. The sidewall 220 defines the body of the feedwell 12 and a feedwell chamber 222 disposed substantially below the inlet 11 and the upper zone 15. In the depicted figure, the upper zone 15 and the transition zone 60 are integral to the feedwell chamber 222. The feedwell chamber 222 is in fluid communication with the inlet 11 and the upper zone 15 i.e. the feed slurry 33 can flow from the inlet 11, through the upper zone 15, and to the feedwell chamber 222.

A ring, hollow shaft, or opening 230 runs through the center of the feedwell 12. In the depicted configuration, the feed slurry 33 generally flows from the inlet 11 into the feedwell chamber 222 and downward into a transition zone 60 wherein the feed slurry 33 moves in a homogeneous circular and downward direction. The inner sidewall surface $220_b$ defines the transition zone 60. The transition zone 60 is generally a part of the feedwell chamber 222. The transition zone 60 allows the feed slurry 33 to transition from having a substantially horizontal movement to having partially horizontal movement and partially vertical movement. From the transition zone 60, the feed slurry 33' flows erratically out of the bottom of the feedwell 12 into the settling zone (13 in FIG. 3) of the clarifier 100, thereby imparting turbulence and shear force to the liquid in the settling zone 13 and disrupting the settlement process.

The single entry feedwell 12' depicted in FIG. 1 does not reduce the velocity of the inlet feed slurry flow 33, but merely allows the feed slurry 33 to swirl as the feed slurry solution 33' reaches the settling zone 13. The swirling feed slurry 33 has a high, non-uniform velocity that may lift or otherwise disturb solids 36, 36', 37 in the solution 33' and thereby reduce the amount of solids 36, 36', 37 that settle out of solution 33'. That is, the turbulence and shear force of the incoming feed slurry 33 can disrupt the settling process and interfere with the solids 36, 36' flocculating together. Reduced flocculation increases the amount of time solids 36, 36' might take to settle out of solution 33'. Furthermore, unsettled solids may be carried over and contaminate the "clarified" liquid that is continuously removed from the clarifier. Incomplete separation can delay production in many chemical manufacturing industries and require further separation, thereby increasing production costs.

Figure 2:
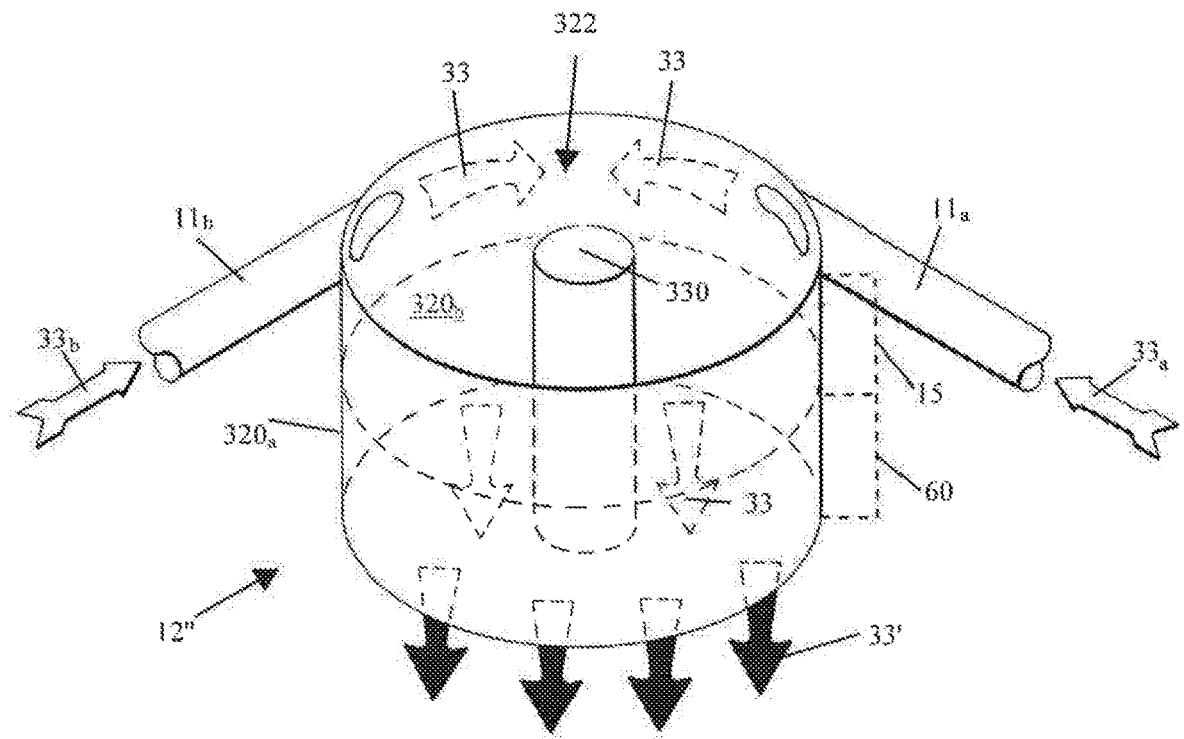
FIG. 2 illustrates a conventional-style opposing tangential inlet feedwell.

FIG. 2 depicts a dual or opposing tangential entry design (as described in U.S. Pat. No. 7,547,396 for example). The feed slurry 33 enters the dual inlet feedwell 12" through dual inlets $11_a$ and $11_b$ fixed tangentially to the outer sidewall surface $320_a$ of the feedwell 12". In theory, the slurry $33_a$ from the inlet $11_a$ would enter the dual inlet feedwell 12" at the same rate of speed as a slurry $33_b$ from the inlet $11_b$. Each slurry, $33_a$, $33_b$, by encountering the other slurry $33_a$, $33_b$ at an equal and opposite rate of speed, would neutralize much of the entrance energy in the transition zone 60. However, flow analysis indicates that opposing tangential inlets $11_a$ and $11_b$ create substantial turbulence and shear in the colliding flows. The turbulence and shear may interfere with the solids 36 flocculating together, thereby reducing the settling of solids from the feed slurry 33, and negatively affecting the clarity of the clarified liquid 38.

Figure 4A:
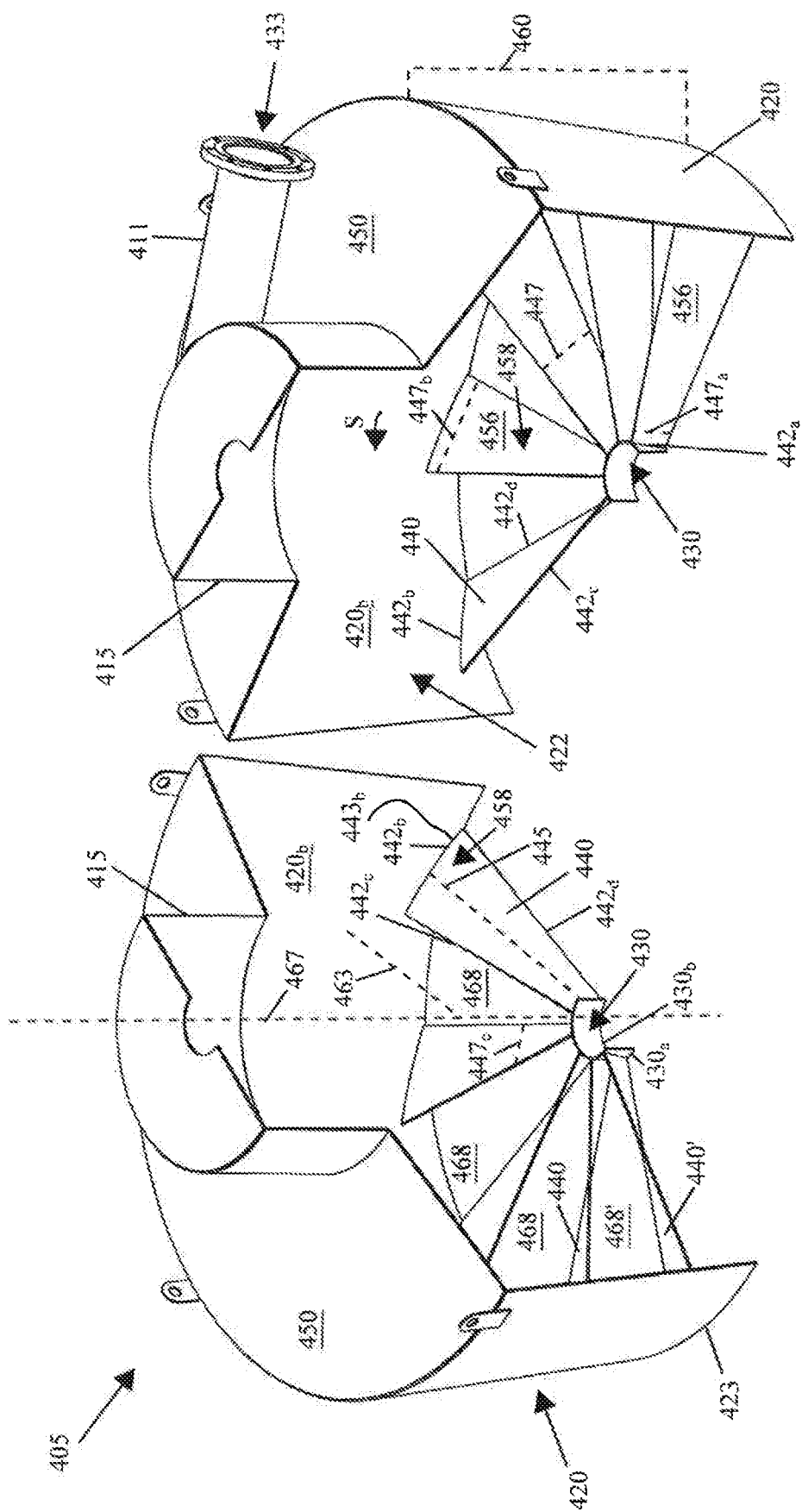
FIG. 4A depicts an isometric cross section of a right half and left half of an exemplary feedwell having exemplary twisted plates configured to twist along the plate's longitudinal axis.

FIG. 4A depicts two cross halves of an exemplary feedwell 405 having exemplary twisted plates 440. The twisted plates 440 have a longitudinal axis 445 disposed parallel to a radial line 463. The radial line 463 extends from a vertical line 467, intersecting the center of the feedwell 405, to the sidewall 420. The center axis of the ring 430 is co-axial with a vertical line 467 extending through the center of the feedwell 405. Each twisted plate 440 engages the exterior surface $430_a$ of the ring 430 at the first end $442_a$ of the twisted plate 440 and extends radially from the ring 430 or a hollow shaft, or an opening defined by the first ends $442_a$ of multiple twisted plates 440 toward the inner sidewall surface $420_b$. That is, the longitudinal axis 445 of each twisted plate 440 is parallel to a radial line 463 extending from the center of the feedwell 405 to the sidewall 420. In other exemplary embodiments, a twisted plate 440 may be offset from the radial line 463 (see for example, FIG. 7B). In certain exemplary embodiments, a twisted plate 440 may extend generally along a radial line 463, but be disposed at an angle relative to the radial line 463. In still further exemplary embodiments, a twisted plate 440 may share no more than one common point with the radial line 463.

In the depicted embodiment, the longitudinal axis 445 bisects the twisted plate 440 and therefore bisects the total volume or thickness of the twisted plate 440. In other exemplary embodiments, the longitudinal axis 445 may be disposed above or below the line bisecting the total volume or thickness of the twisted plate 440. The longitudinal axis 445 is the line around which the twisted plate 440 twists. In the depicted embodiment, the longitudinal axis 445 is equidistant from the bottom side $442_d$ and top side $442_c$ of the twisted plate 440. The twisted plate 440 is twisted around the longitudinal axis 445 regardless of the longitudinal axis's position relative to the line bisecting the total volume of the twisted plate 440 or the longitudinal axis's distance from the bottom side $442_d$ and top side $442_c$. It will be understood that in certain exemplary embodiments, a twisted plate 440 may have more volume below the longitudinal axis 445 such that the twisted plate 440 is thicker below the longitudinal axis 445 than above the longitudinal axis 445. In other exemplary embodiments, the twisted plate 440 may have more volume above the longitudinal axis 445 such that the twisted plate 440 is thicker above the longitudinal axis 445 than below the longitudinal axis 445.

The ring 430 is disposed at the center of feedwell 405. The ring 430 has an exterior surface $430_a$ opposite an interior surface $430_b$. In the depicted embodiment, the first end $442_a$ of each twisted plate 440 engages the exterior surface $430_a$ of the ring 430. The second end $442_b$ extends to the inner sidewall surface $420_b$. Adjacent twisted plates 440 define gaps 468 through which slurry 33 eventually exits the feedwell 405. The gaps 468 may be of any suitable dimensions, including width, length, and height. In the depicted embodiment, the gaps 468 are substantially equidistant from adjacent gaps 468 and the gaps have substantially equal dimensions defining a substantially uniform area. However, it will be appreciated that in other exemplary embodiments, the gaps 468 may be disposed around the ring 430 such that the gaps 468 are not equidistant from adjacent gaps 468. In other exemplary embodiments, the gaps 468 need not have substantially uniform dimensions.

Figure 4B:
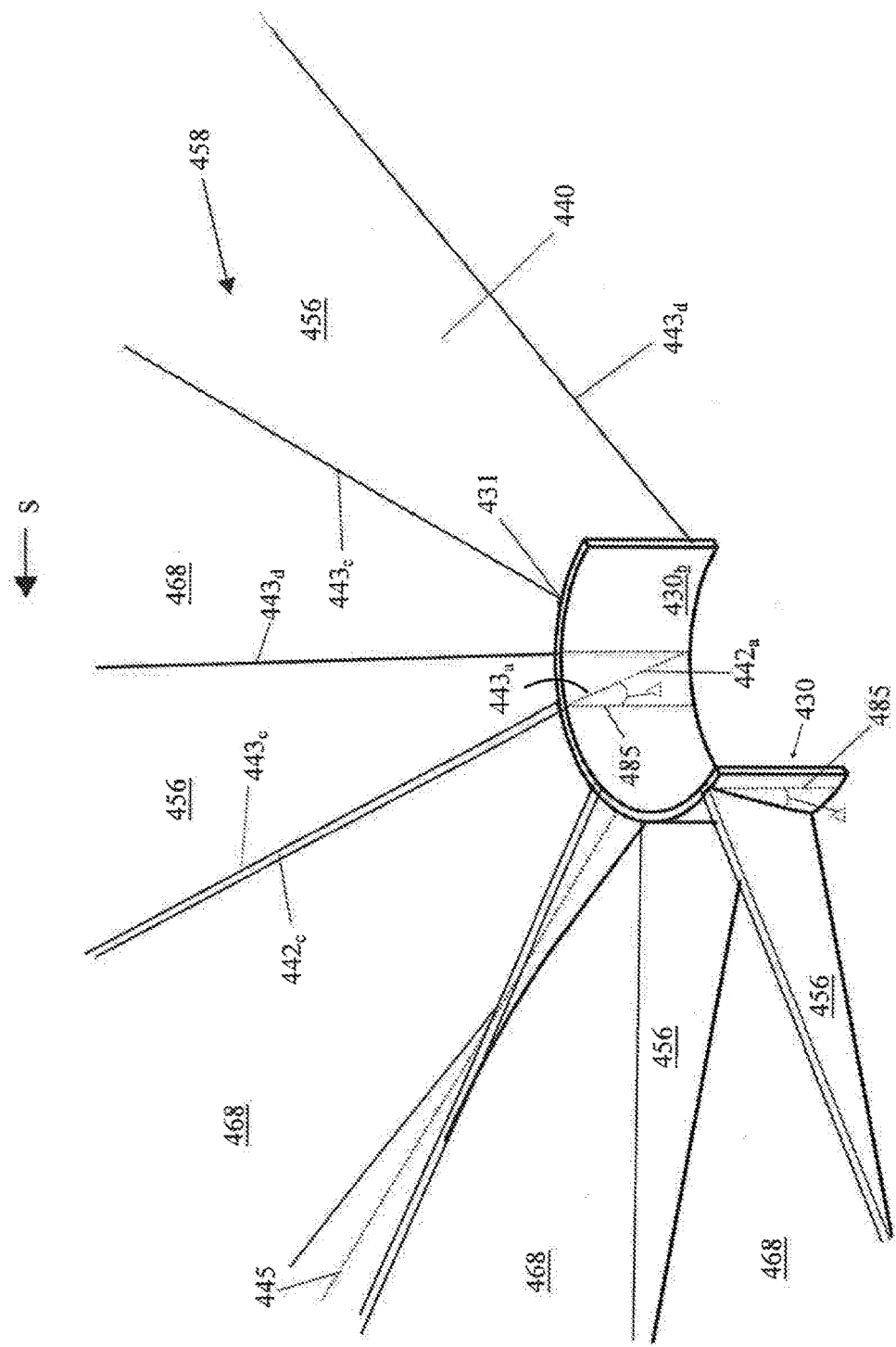
FIG. 4B is a detailed isometric view of an exemplary twisted plate having the first end engaging the ring at an initial angle.
Figure 5A:
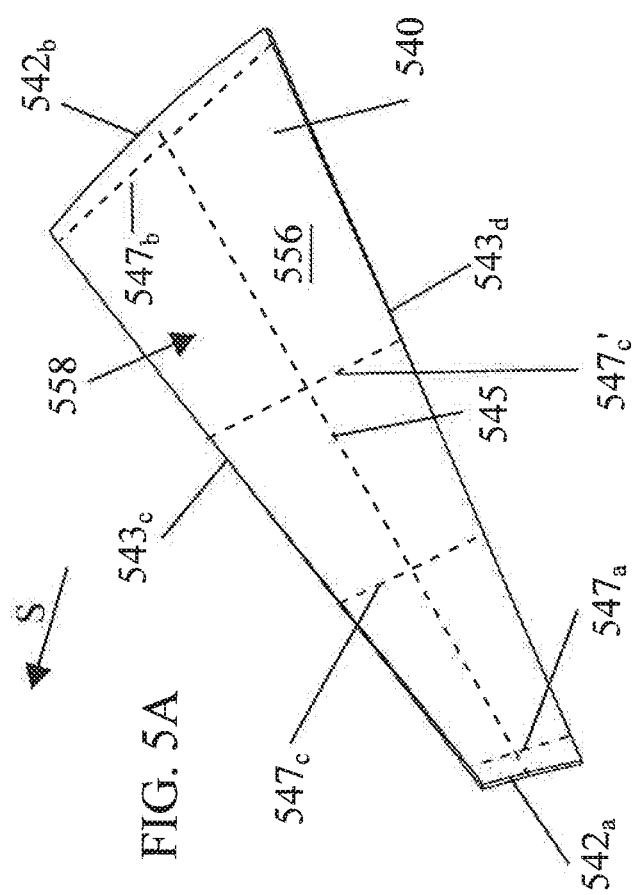
FIGS. 5A-5D depict several views an exemplary twisted plate twisted along the twisted plate's longitudinal axis.
Figure 5B:
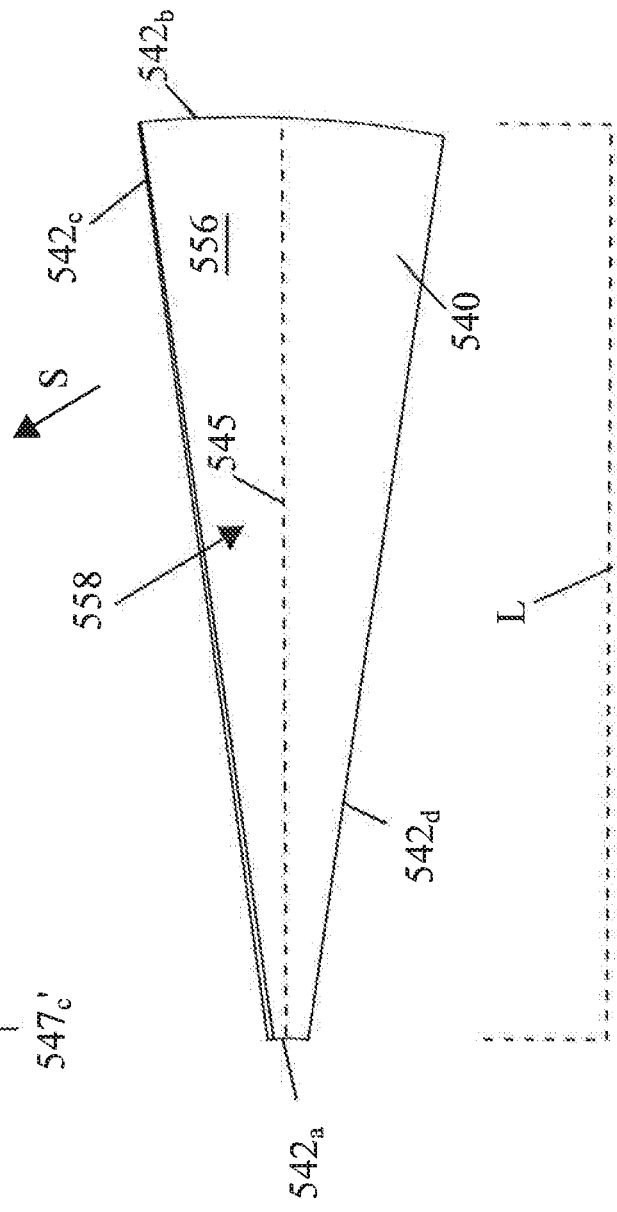
Figure 5C:
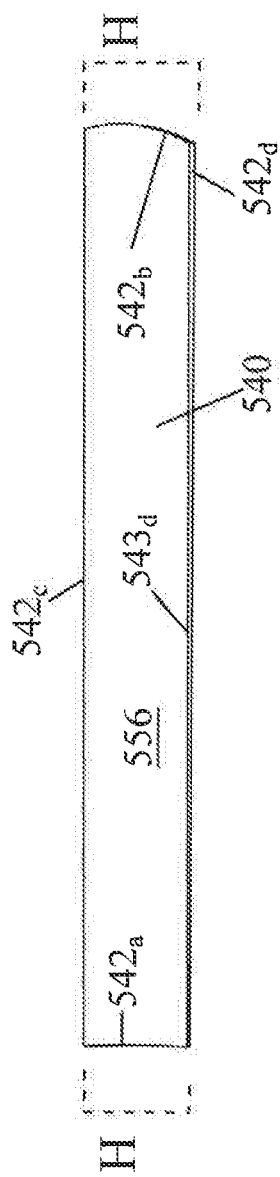
Figure 5D:
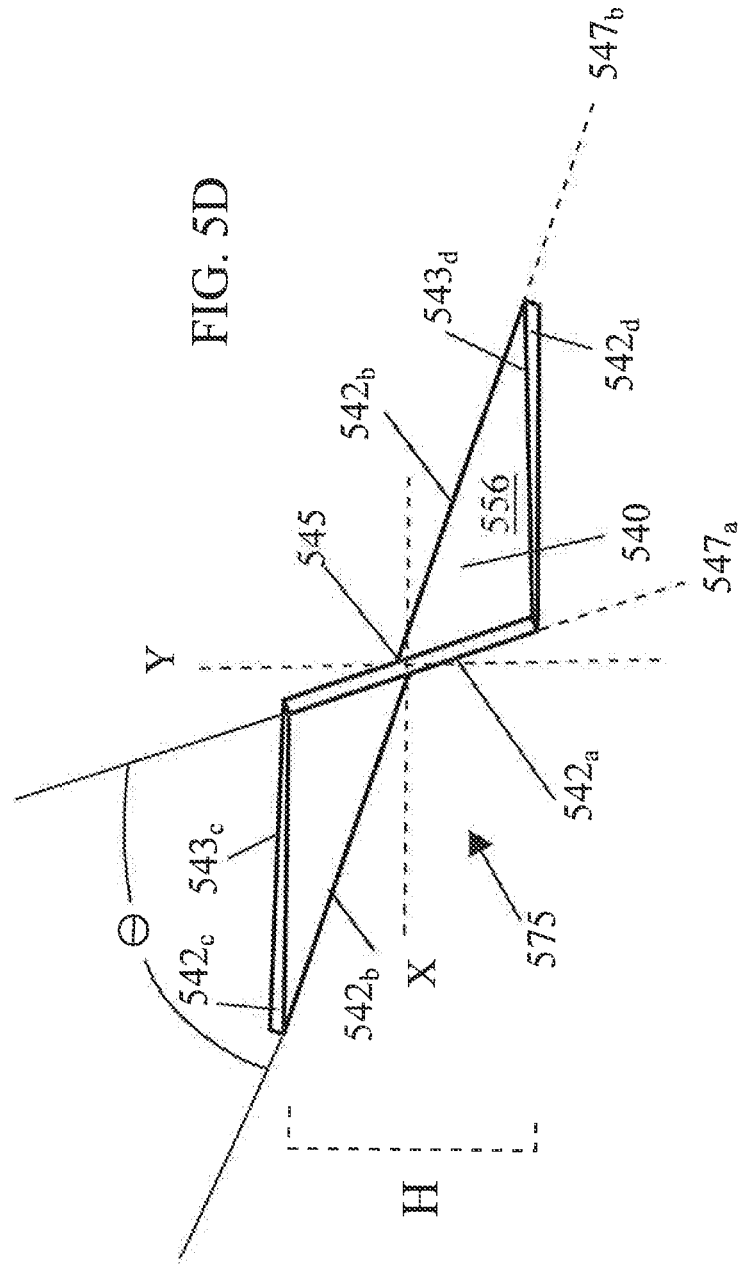

The first end $442_a$ of a twisted plate 440 has a first slope $447_a$ as measured on a two-dimensional Cartesian plane (575 in FIG. 5D). The second end $442_b$ has a final slope $447_b$ as measured on a two-dimensional Cartesian plane 575. A slope 447 is the shortest straight line extending from the top edge $443_c$ (FIG. 4B) of the twisted plate 440 to the bottom edge $443_d$ (FIG. 4B) for any given point along the twisted plate 440. As the twisted plate 440 extends from the first end $442_a$ to the second end $442_b$ along a given twisted plate 440, the slope 447 gradually decreases, e.g. becomes shallower. That is, intermediate slopes $447_c$ disposed between the first slope $447_a$ and the final slope $447_b$ gradually decreases as an observer's eye moves from the first end $442_a$ to the second end $442_b$. In certain exemplary embodiments, the intermediate slopes 447, decrease continuously between the first slope $447_a$ and the final slope $447_b$. In other exemplary embodiments, the intermediate slopes $447_c$ may decrease at intervals between the first end $442_a$ and the second end $442_b$. In this manner, the twisted plate 440 twists around the longitudinal axis 445.

In FIG. 4A, the second end $442_b$ of the twisted plate 440 is longer than the first end $442_a$. As a result, the surface area 456 of the leading face 458 of the twisted plate 440 appears to increase as observer's eye moves from the first end $442_a$ to the second end $442_b$. The surface area 456 of the leading face 458 is defined by the area of the twisted plate 440 configured to oppose the general flow direction of the feed slurry 433. In the depicted embodiment, the surface area 456 of the leading face 458 is defined by the area between a first edge $443_a$ of the first end $442_a$, a first edge $443_b$ of the second end $442_b$, a first top edge $443_c$ of the top side $442_c$, and a first bottom edge $443_d$ of the bottom side $442_d$ of the twisted plate 440 that is.

The inlet 411 introduces the feed slurry 433 to a raised upper zone 415 attached to the top surface 450 of the feedwell 405. In the depicted embodiment, the upper zone 415 and the transition zone 460 are generally integral to the feedwell chamber 422. In certain example embodiments, the inlet 411 may be provided substantially tangentially to the feedwell 405, such that the inlet 411 communicates with the upper zone 415 of the feedwell 405. In other examples, the inlet 411 may be arranged at an angle, such that the feed slurry travels at an upward angle to enter the feedwell 405. This may advantageously assist in reducing the velocity of the feed slurry 433.

The velocity of the feed slurry 433 may comprise a horizontal velocity vector. Without being bounded by theory, the upper zone 415 may absorb some of the energy from the feed slurry 433 as the upper zone 415 redirects the feed slurry 433 from a substantially linear flow into a circular flow. The feed slurry 433 may flow partially or completely around the upper zone 415 before flowing downward through the transition zone 460 in a counter clockwise direction. It will be understood that other exemplary feedwells 405 may be configured to have the feed slurry 433 flow through the transition zone 460 in a clockwise direction. Desirably, the feed slurry 433 moves in a downward and substantially homogeneous circular direction S. As the feed slurry 433 flows through the transition zone 460 toward the bottom 423 of the feedwell 405, the feed slurry 433 encounters the multiple twisted plates 440.

The multiple twisted plates 440 are arranged such that the leading face 458 of the twisted plates 440 faces the incoming feed slurry 433. Without being bounded by theory, the leading face 458 and twist of the twisted plates 440 may supply friction gradually to offset the horizontal velocity vector of the feed slurry 433. The contour of the leading face 458 of the twisted plate 440 is thought to provide more gradual resistance to faster flowing feed slurry near the inner sidewall surface $420_b$ and greater resistance to slower moving feed slurry swirling more radially inward of the inner sidewall surface $420_b$. The feed slurry 433 may experience resistance as the twisted plates 440 exert an opposing force on the feed slurry 433, and facilitate changing the feed slurry's turbulent horizontal circular flow into a substantially vertical plug flow. Feed slurry 433 having kinetic energy greater than the twisted plate's frictional force may flow over the top side $442_c$ of the twisted plate 440 before either falling through an adjacent gap 468' or encountering an adjacent twisted plate 440' disposed across the adjacent gap 468'. Feed slurry 433 having less kinetic energy than a twisted plate's frictional force may flow down the twisted plate's leading face 458 and through a gap 468. In addition to slowing the velocity of the feed slurry 433, the twisted plates 440 may also direct the feed slurry 433 into the settling zone 13 (shown in FIG. 3) of the tank 10 with a substantially uniform downward flow, e.g. a plug flow. In this manner, the twisted plates 440 slow the velocity of the feed slurry 433 to a substantially even flow rate without increasing turbulence or shear force.

In certain example embodiments, the twisted plates 440 may be substantially circular, oval, triangular, or rectangular in shape. However, any appropriate shape may be used in different example embodiments. It will also be understood that in certain exemplary embodiments, the first end $442_a$ of a twisted plate 440 may engage the ring 430 and the second end $442_b$ can extend toward the inner sidewall surface $420_b$ without engaging the sidewall 420. Likewise, in other exemplary embodiments, the second end $442_b$ of a twisted plate 440 can engage the inner sidewall surface $420_b$ and the first end $442_a$ of the twisted plate 440 can extend toward the center of the feedwell 405 without engaging the ring 430. In a variation of this exemplary embodiment, the ring 430 may be absent. The ring 430 may be replaced with a hollow shaft, or an opening defined by the first ends $442_a$ of multiple twisted plates 440. Combinations of the exemplary embodiments disclosed herein are considered to be within the scope of this disclosure.

Figure 4C:
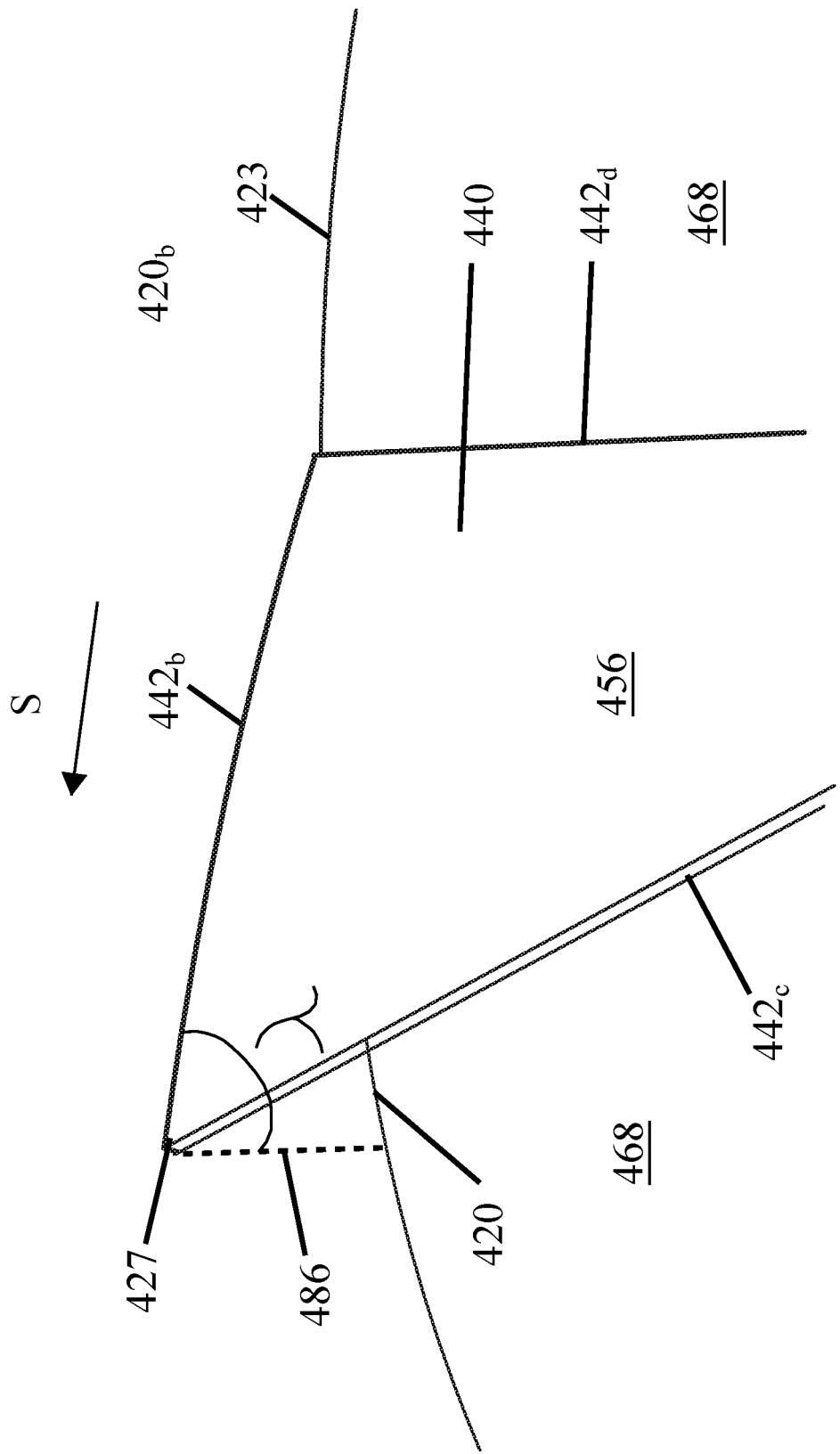
FIG. 4C is a detailed isometric view of an exemplary twisted plate having the second end engage the inner surface of the sidewall at a final angle.

FIG. 4B is a close-up view of the ring 430 and engaging first ends $442_a$ of the twisted plates 440. FIG. 4B further illustrates the twist of the twisted plate 440 around the longitudinal axis 445. This detailed FIG. 4B shows that the first end $442_a$ engages the exterior surface $430_a$ of the ring 430 at an initial angle Δ. The initial angle Δ is the angle between the first slope $447_a$ of the first end $442_a$ relative to a vertical line 485 passing through a first top corner 431 at the first end $442_a$. The first top corner 431 of the first end $442_a$ of the twisted plate 440 is the vertex of the initial angle Δ. In certain exemplary embodiments initial angle Δ may be between 0 degrees and 20 degrees, between 5 degrees and 20 degrees, between 5 degrees and 15 degrees, between 2 degrees and 10 degrees, between 3 degrees and 20 degrees, between 3 degrees and 18 degrees, and all subsets thereof. As depicted in FIGS. 4B and 4C, the initial angle Δ may be less than 90 degrees and is smaller than the final angle 1. The initial angle Δ may be selected based upon the rate at which feed slurry 433 enters the feedwell 405. In other exemplary embodiments, the initial angle Δ may be selected based upon physical characteristics of the feed slurry 433, such as the feed slurry's viscosity, density, or other physical characteristics. It will be understood that the value of the initial angle Δ and the final angle λ may be selected based on upon the horizontal or vertical velocity vector at which feed slurry 433 is expected to contact the leading face 458 of a twisted plate 440.

FIG. 4C depicts the second end $442_b$ of the twisted plate 440 engaging the inner sidewall surface $420_b$. The final angle λ is the angle between a vertical line 486 intersecting the second top corner 427 at the twisted plate's second end $442_b$ and the final slope $447_b$ of the second end $442_b$. The second top corner 427 is the vertex of the final angle λ. The final angle λ is less than 90 degrees, but is greater than the initial angle Δ. The final angle λ may be in a range of 45 degrees and 75 degrees, between 45 degrees and 65 degrees, between 35 degrees and 75 degrees, between 55 degrees to 85 degrees, between 45 degrees to 85 degrees and all subsets thereof. The direction of feed slurry flow is represented by arrow S. The final angle λ may be selected based upon the rate at which feed slurry 433 enters the feedwell 405. In other exemplary embodiments, the final angle λ may be selected based upon physical characteristics of the feed slurry 433, such as viscosity, density, or other physical characteristics.

FIG. 5A is an isometric view of an exemplary twisted plate 540. The first end $542_a$ is oppositely disposed from the second end $542_b$. A first slope $547_a$ is at the first end $542_a$ and a final slope $547_b$ is at the second end $542_b$. The longitudinal axis 545 extends along the length L (FIG. 5B) of the twisted plate 540 and the twisted plate 540 is twisted around the longitudinal axis 545. As the twisted plate 540 extends from the first end $542_a$ toward the second end $542_b$, the distance between the first top edge $543_c$ and the first bottom edge $543_d$ increases. Accordingly, the surface area 556 of the leading surface 558 increases as the twisted plate 540 extends from the first end $542_a$ toward the second end $542_b$. Intermediate slopes $547_c$ are depicted between the first slope $547_a$ and final slope $547_b$. The intermediate slopes $547_c$ are less steep than the first slope $547_a$, but are steeper than the final slope $547_b$. Successive intermediate slopes $547_c{'}$ become shallower the closer a given intermediate slope $547_c{'}$ is disposed to the final slope $547_b$. It will be understood that any number of intermediate slopes $547_c$ can exist between the first end $542_a$ and the second end $542_b$.

FIG. 5B is a top-down view of an exemplary twisted plate 540 further exemplifying the increase in the surface area 556 of the leading face 558 as an observer's eye moves from the first end $542_a$ toward the second end $542_b$. FIG. 5C is a front view of an exemplary twisted plate 540. The leading face 558 faces the viewer. In the depicted embodiment, the height H of the first end $542_a$ is the same as the height H of the second end $542_b$. That is, while the distance between the top side $542_c$ and the bottom side $542_d$ increase from the first end $542_a$ toward the second end $542_b$, the height H between the top side $542_c$ and the bottom edge $542_d$ does not change. In other exemplary embodiments, the height H between the top side $542_c$ and the bottom side $542_d$ may increase. In still other exemplary embodiments, the height H between the top side $542_c$ and the bottom side $542_d$ may decrease.

FIG. 5D is a side view of an exemplary twisted plate 540 in which the first end $542_a$ is closer to the viewer than the second end $542_b$. The angle between the first end $542_a$ and the second end $542_b$ is the offset angle θ. The longitudinal axis 545 is the vertex of offset angle θ. The offset angle θ is the measurement of the amount of twist in a twisted plate. The offset angle may vary θ between 25 degrees and 75 degrees, between 45 degrees and 75 degrees, between 25 degrees and 55 degrees, between 55 degrees and 75 degrees and any subsets thereof depending upon the embodiment. The offset angle θ may be selected based upon the rate at which feed slurry 433 enters the feedwell 405. In other exemplary embodiments, the offset angle θ may be selected based upon physical characteristics of the feed slurry 433, such as viscosity, density, or other physical characteristics.

FIG. 5D further illustrates a constant height H. That is, although the distance between the top side $542_c$ and the bottom side $542_d$ is greater at the second end $542_b$ than the distance between the top side $542_c$ and the bottom side $542_d$ at the first end $542_a$, the height H of the top side $542_c$ and the bottom side $542_d$ is substantially constant. FIG. 5D further illustrates the twist of the twist plate 540 along the longitudinal axis 545. A two-dimensional Cartesian plane 575 is shown for reference. Both the Y and X axes are perpendicular to the longitudinal axis 545. The first slope $547_a$ is steeper than the final slope $547_b$ as measured along the reference two-dimensional Cartesian plane 575.

Figure 6A:
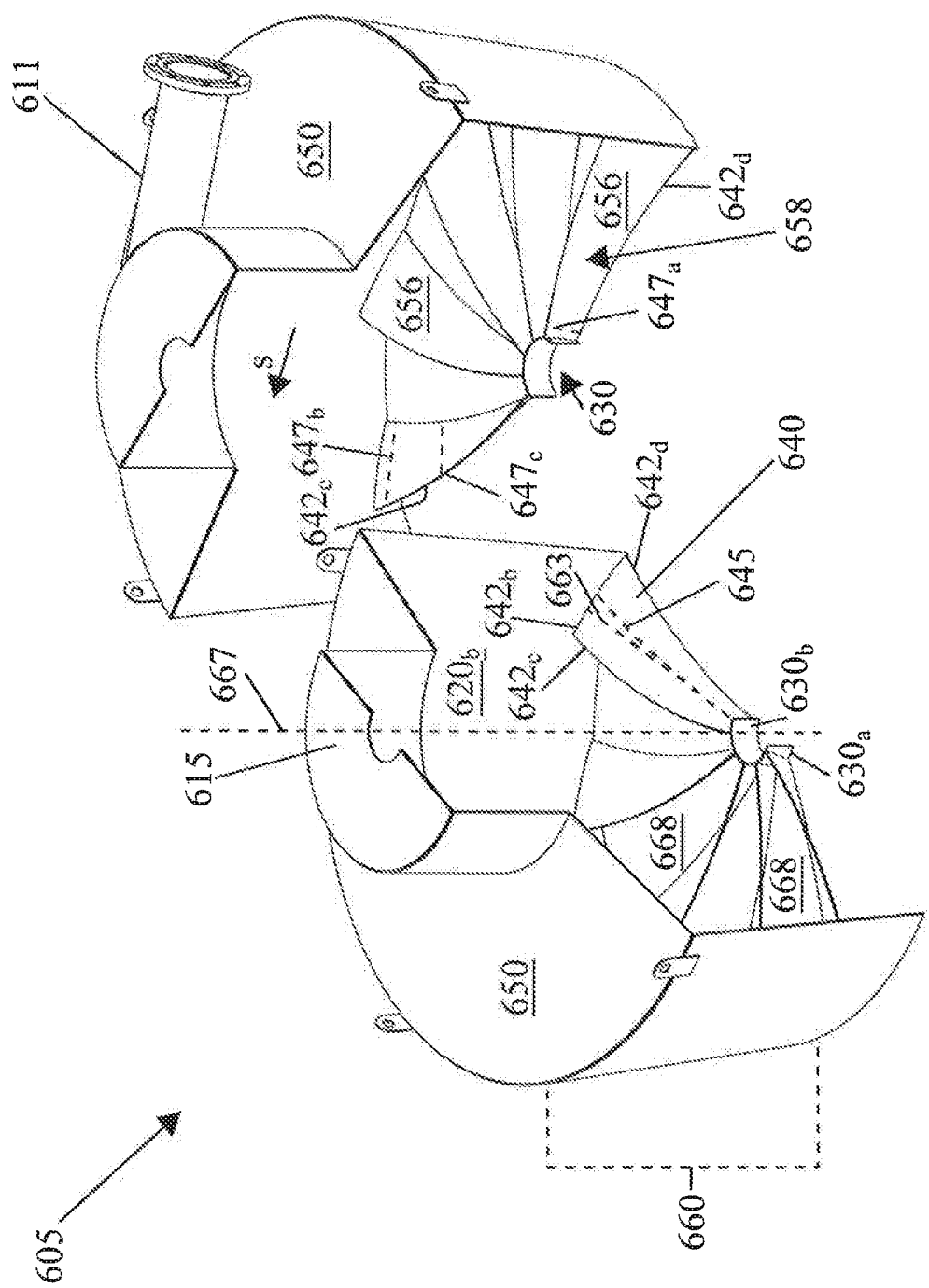
FIG. 6A is an isometric view of an exemplary feedwell having a twisted plate comprising a curved top side and a curved bottom side.
Figure 6B:
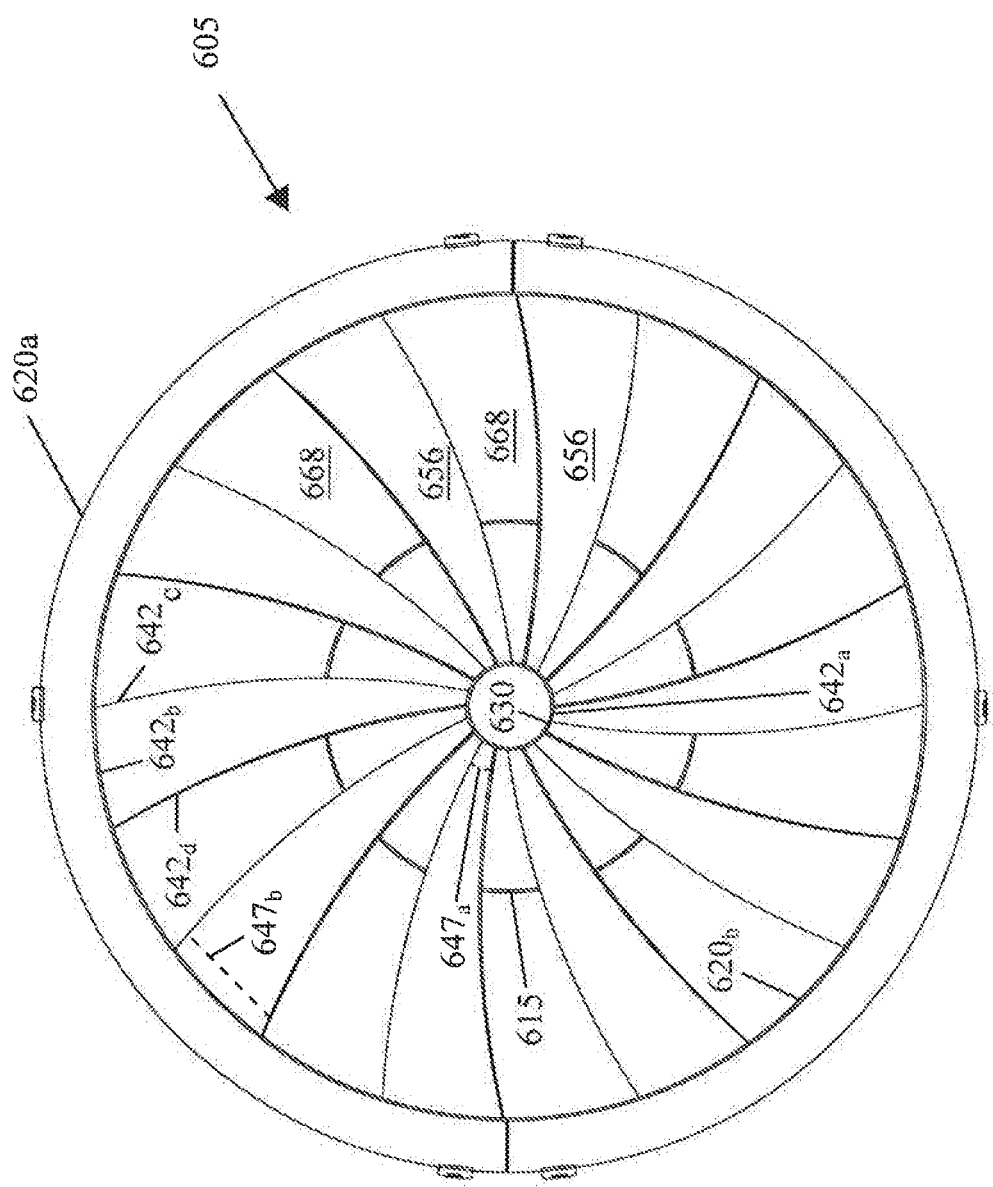
FIG. 6B is bottom up view of an exemplary feedwell having twisted plates comprising a curved top side and a curved bottom side.

FIG. 6A is an isometric view of an exemplary feedwell 605 having curved twisted plates 640 disposed substantially radially around the ring 630 or a hollow shaft, or an opening defined by the first ends $642_a$ of the multiple twisted plates 640. The top side $642_c$ and the bottom side $642_d$ are curved. In the depicted embodiment, the top side $642_c$ is parallel to the bottom side $642_d$. Consequentially, the longitudinal axis 645 curves with either the top side $642_c$ or the bottom side $642_d$ and thereby becomes offset from the radial line 663 as the longitudinal axis 645 approaches the inner sidewall surface $620_b$. In FIGS. 6A and 6B, the longitudinal axis 645 is asymptotic to a radial line 663, although it will be understood that the longitudinal axis 645 may be coextensive with or parallel to the radial line 663 near the first end $642_a$ of the curved twisted plate 640. In other exemplary embodiments, either the top side $642_c$ or the bottom side $642_d$ may be curved while the distally disposed side (either $642_c$ or $642_d$) is not curved. In still other exemplary embodiments, the longitudinal axis 645 may be curved relative to a vertical line 667. In addition to approaching a radial line 663 asymptotically at the first end $642_a$, the longitudinal axis 645 also forms a parabola relative to a radial line 663 intersecting the first end $642_a$ and second end $642_b$ of a twisted plate 640.

FIG. 6B. is a bottom-up of the exemplary feedwell of FIG. 6A. The twisted plates 640 fan radially outward from the ring 630 and better illustrate the asymptotic relationship between the longitudinal axis 645 and the radial line 663. The second end $642_b$ is longer than the first end $642_a$. Consequently, the surface area 656 of the leading face 658 seems to increase as an observer's eye moves from the first end $642_a$ to the second end $642_b$. Similarly to the embodiment depicted in FIGS. 4A-4C, the final slope $647_b$ is shallower than the first slope $647_a$ and all intermediate slopes $647_c$ disposed between the first slope $647_a$ and the final slope $647_b$.

Figure 7A:
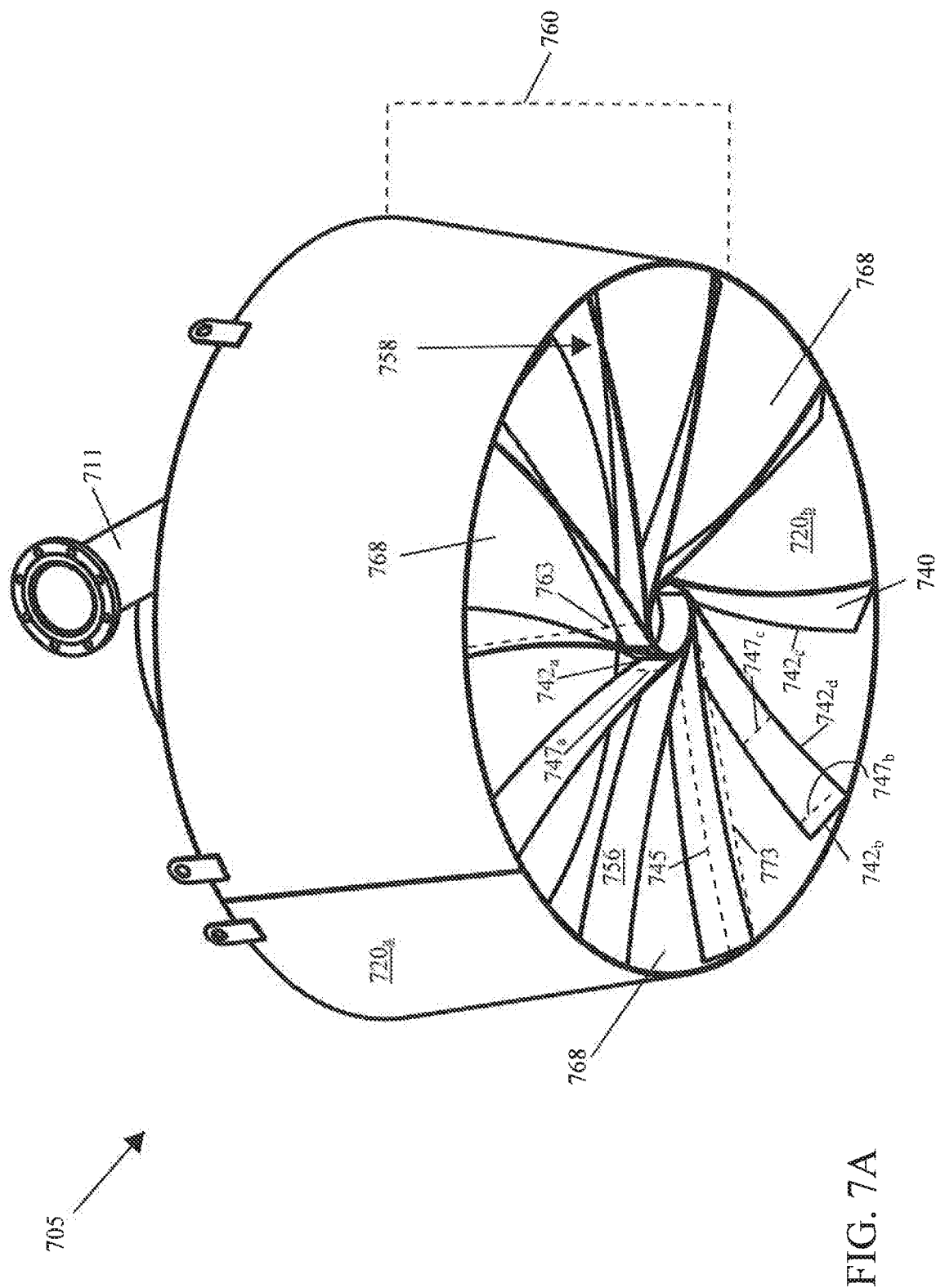
FIG. 7A is a detailed isometric view of an exemplary feedwell having a curved twisted plate wherein the surface area of the twisted plate remains constant as measured from the first end to the second end and wherein the longitudinal axis of the twisted plate is disposed along a tangent line extending from the ring.

FIG. 7A is an isometric view of a feedwell 705 having exemplary curved twisted plates 740. In the depicted embodiment, the top side $742_c$ is not parallel to the bottom side $742_d$ of the twisted plate 740. The longitudinal axis 745 is disposed between the top side $742_c$ and the bottom side $742_d$. The second end $742_b$ is substantially the same length as the first end $742_a$ of the twisted plate 740. In this manner, the surface area 756 of the leading face 758 does not increase as an observer moves an eye from the first end $742_a$ to the second end $742_b$. The first slope $747_a$ is steeper than the intermediate slopes $747_c$ and the final slope $747_b$. The initial angle Δ (see FIG. 4B) is zero degrees.

In this exemplary embodiment, the longitudinal axis 745 is disposed parabolically relative to a tangent line 773 that is tangent to the ring 730 or a hollow shaft, or an opening defined by the first ends $742_a$ of multiple twisted plates 740.

The curved twisted plates 740 are not disposed parallel to a radial line 763 intersecting the center of the feedwell 705. It will be understood that in other exemplary embodiments, the longitudinal axis 745 may extend from the ring 730 or a hollow shaft, or an opening defined by the first ends 742$_a$ of multiple twisted plates 740 toward any point on the inner sidewall surface 720$_b$ along any path. In other exemplary embodiments, the longitudinal axis 745 may be disposed at an angle to the tangent line 773. In other exemplary embodiments, the longitudinal axis 745 may be disposed at an angle to the radial line 763. In still other exemplary embodiments, the longitudinal axis 745 may be disposed asymptotically, logarithmically, exponentially, parabolic to, parallel to, or at an angle to a tangent line 773, radial line 763, a line disposed between a tangent line and radial line, or any line, extending from the ring 730 toward the inner sidewall surface 720$_b$. It will be understood that any combination of the embodiments disclosed in this description are considered to be within the scope of this disclosure.

Figure 7B:
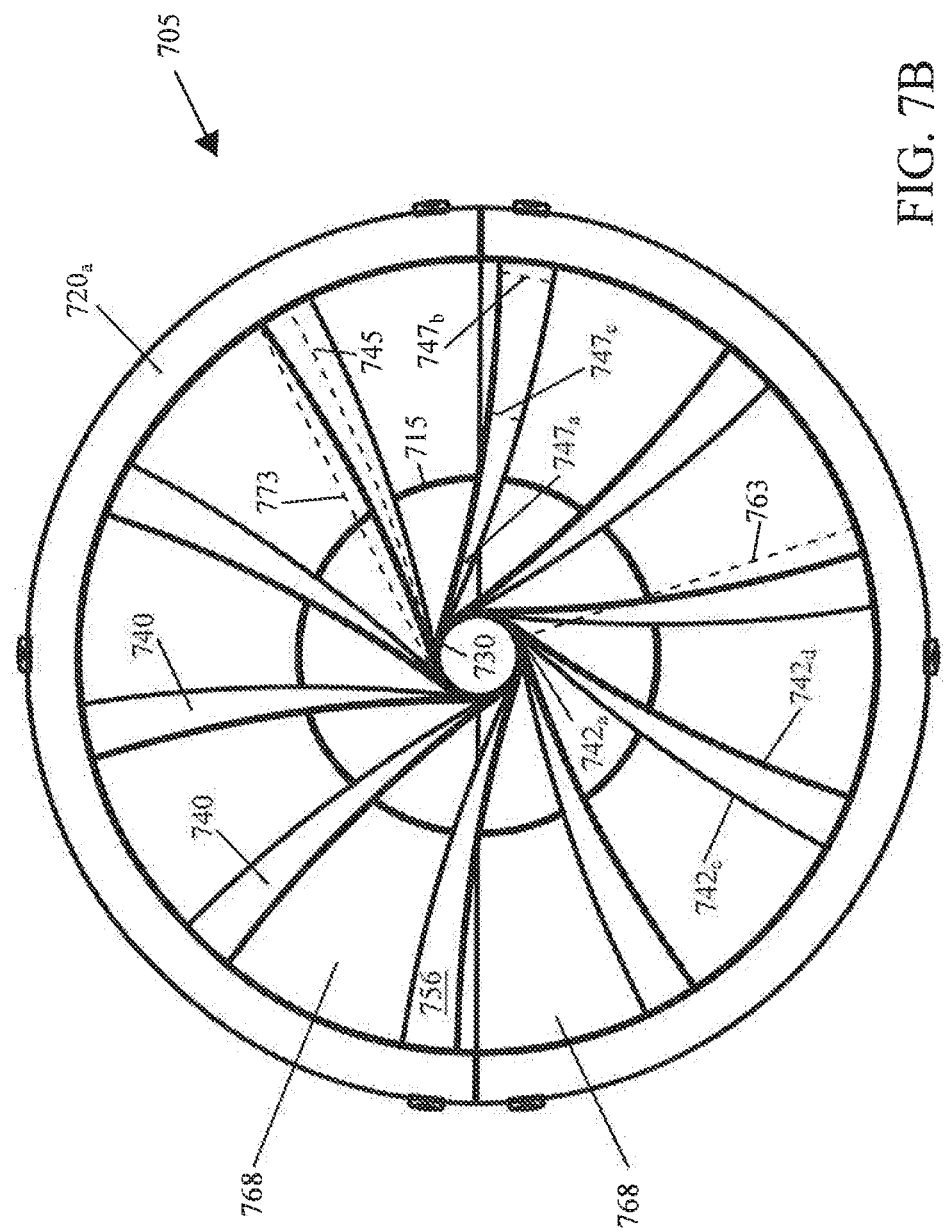
FIG. 7B is a bottom-up view of the feedwell having the exemplary curved twisted plates of FIG. 7A.

FIG. 7B is a two-dimensional bottom-up view of the feedwell 705 with the exemplary curved twisted plates 740 of FIG. 7A and more clearly illustrates that the longitudinal axis 745 extending from the first end 742$_a$ to the second end 742$_b$ of the twisted plate 740 is a parabola relative to the tangent line 773 extending the first end 742$_a$ to the second end 742$_b$. The bottom side 742$_d$ of the twisted plate 740 may be configured to intersect the tangent line 773 at the first end 742$_a$ and the second end 742$_b$. In other exemplary embodiments, the top side 742$_c$ may be configured to intersect the tangent line 773 at the first end 742$_a$ and the second end 742$_b$.

In an exemplary embodiment, a feedwell may comprise: a housing comprising a sidewall and an inlet, wherein the sidewall defines a feedwell chamber disposed substantially below the inlet, and the feedwell chamber is in fluid communication with the inlet; and wherein the exemplary feedwell comprises twisted plates, each twisted plate having: a top side distally disposed from a bottom side, a first end distally disposed from a second end, the second side engaging the sidewall below the inlet, and a longitudinal axis disposed between the top side and the bottom side and extending from the first end to the second end, wherein the first end has a first slope, wherein the second end has a final slope, wherein the final slope is shallower than the first slope, and, wherein each twisted plate is twisted around the longitudinal axis.

An exemplary feedwell may further comprise a ring disposed along a vertical axis under a transition zone, the transition zone being an area in the feedwell chamber between the inlet and the twisted plates, the ring having an interior surface and an exterior surface, wherein the first end engages the exterior surface of the ring at an initial angle, and wherein the initial angle is defined by the first slope of first end relative to a vertical line intersecting a first top corner of the first end, wherein the first top corner of the first end is a vertex of the initial angle.

An exemplary feedwell may further have the second end engaging an inner sidewall surface at a final angle, wherein the final angle is defined by the final slope of the second end and a vertical line intersecting a second top corner of the second end of the twisted plate, wherein the second top corner of the second end is a vertex of the final angle.

Another exemplary feedwell may comprise: a sidewall having an inner sidewall surface and an outer sidewall surface; a ring coaxially disposed with a vertical line extending through the feedwell, wherein the ring has an exterior surface and an interior surface; and wherein the feedwell further comprises a twisted plate disposed between the ring exterior surface and the inner sidewall surface, wherein the twisted plate has a top side distally disposed from a bottom side, a first end extending from the exterior surface of the ring, a second end distally disposed from the first end, wherein the second end extends toward the inner surface of the sidewall at a final angle, and a longitudinal axis extending from the first end to the second end, wherein the first end has a first slope, wherein the second end has a final slope, wherein the final slope is shallower than the first slope, and wherein the twisted plate is twisted around the longitudinal axis.

In other exemplary embodiments, the longitudinal axis of a twisted plate of the twisted plates is parallel to a radial line may extend from a center of the feedwell to the sidewall. In still other exemplary embodiments, the first end of a twisted plate has a height and the second end of the twisted plate has a height, wherein the height of the second end of the twisted plate is greater than the height of the first end of the twisted plate. In other embodiments, the top side is curved, the bottom side is curved, or both the top side and the bottom side of a twisted plate of the twisted plates are curved.

In still other exemplary embodiments, the longitudinal axis forms a parabola relative to a radial line intersecting the first end of a twisted plate of the twisted plates. In yet other exemplary embodiments, the longitudinal axis asymptotically approaches a radial line at the first end of a twisted plate of the twisted plates, wherein the radial line extends from a center of the feedwell toward the sidewall. The longitudinal axis is disposed asymptotically, logarithmically, exponentially, parabolic to, parallel to, or at an angle to a tangent line, radial line, or a line disposed between a tangent line and radial line, extending from the a center of the feedwell toward the sidewall.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the invention.

What is claimed is:

1. A feedwell comprising:
    a housing comprising a sidewall and an inlet, the sidewall defining a feedwell chamber disposed substantially below the inlet, and the feedwell chamber being in fluid communication with the inlet; and
    twisted plates, each twisted plate comprising:
        a top side distally disposed from a bottom side, a first end distally disposed from a second end, the second end engaging the sidewall below the inlet, and a longitudinal axis disposed between the top side and the bottom side and extending from the first end to the second end,
        wherein the first end has an initial slope,
        wherein the second end has a final slope,
        wherein the final slope has an acute angle greater than an acute angle of the initial slope, wherein the acute angle of the final slope and the acute angle of the initial slope are measured with respect to a vertical line, and,
        wherein each twisted plate is twisted around the longitudinal axis.

2. The feedwell of claim 1, wherein the second end is longer than the first end.

3. The feedwell of claim 1, further comprising an offset angle between the first end and the second end, wherein the offset angle is selected from the range consisting of: 25 degrees to 75 degrees, 45 degrees to 75 degrees, 25 degrees to 55 degrees, 55 degrees to 75 degrees.

4. The feedwell of claim 1 further comprising a ring disposed along a vertical axis under a transition zone, the transition zone being an area in the feedwell chamber between the inlet and the twisted plates, the ring having an interior surface and an exterior surface, wherein the first end engages the exterior surface of the ring at an initial angle, and wherein the initial angle is defined by the initial slope of the first end relative to a vertical line intersecting a first top corner of the first end, wherein the first top corner of the first end is a vertex of the initial angle.

5. The feedwell of claim 4, wherein the initial angle is between 0 degrees and 20 degrees, 5 degrees and 20 degrees, 5 degrees and 15 degrees, 2 degrees and 10 degrees, 3 degrees and 20 degrees, 3 degrees and 18 degrees.

6. The feedwell of claim 1, wherein the second end engages an inner sidewall surface of the housing at a final angle, wherein the final angle is defined by the acute angle of the final slope of the second end and a vertical line intersecting a second top corner of the second end of the twisted plate, wherein the second top corner of the second end is a vertex of the final angle.

7. The feedwell of claim 6, wherein the final angle is between 45 degrees and 75 degrees, 45 degrees and 65 degrees, 35 degrees and 75 degrees, 55 degrees to 85 degrees, 45 degrees to 85 degrees.

8. The feedwell of claim 1, wherein the longitudinal axis of a twisted plate of the twisted plates is parallel to a radial line extending from a center of the feedwell to the sidewall.

9. The feedwell of claim 1, wherein the first end of a twisted plate has a height and the second end of the twisted plate has a height, wherein the height of the second end of the twisted plate is greater than the height of the first end of the twisted plate.

10. The feedwell of claim 1, wherein the top side is curved, the bottom side is curved, or both the top side and the bottom side of a twisted plate of the twisted plates are curved.

11. The feedwell of claim 10, wherein the longitudinal axis forms a parabola relative to a radial line intersecting the first end of a twisted plate of the twisted plates.

12. The feedwell of claim 1, wherein the longitudinal axis asymptotically approaches a radial line at the first end of a twisted plate of the twisted plates, wherein the radial line extends from a center of the feedwell toward the sidewall.

13. A twisted plate for a feedwell, the twisted plate comprising:
    a top side distally disposed from a bottom side;
    a first end extending from an exterior surface of a ring, wherein the ring is coaxially disposed with a vertical line extending through the feedwell;
    a second end distally disposed from the first end, wherein the second end extends toward an inner surface of a feedwell housing sidewall, and wherein a longitudinal axis extends from the first end to the second end,
    wherein the first end has an initial slope,
    wherein the second end has a final slope,
    wherein the final slope has an acute angle greater than an acute angle of the initial slope, wherein the acute angle of the final slope and the acute angle of the initial slope are measured with respect to a vertical line, and
    wherein the twisted plate is twisted around the longitudinal axis.

14. The twisted plate of claim 13, wherein the second end is longer than the first end.

15. The twisted plate of claim 13, wherein the longitudinal axis of the twisted plate is parallel to a radial line extending from a center of the ring to the feedwell housing sidewall.

16. The twisted plate of claim 13, wherein the top side is curved, the bottom side is curved, or both the top side and the bottom side of the twisted plate are curved.

17. The twisted plate of claim 16, wherein the longitudinal axis forms a parabola relative to a tangent line intersecting the first end of the twisted plate.

18. The twisted plate of claim 13, wherein the longitudinal axis asymptotically approaches a radial line at the first end of the twisted plate, the radial line extending from the ring to the inner surface of the feedwell housing sidewall.

19. The twisted plate of claim 13, wherein the second end engages the inner sidewall surface at a final angle, wherein the final angle is defined by the acute angle of the final slope of the second end and a vertical line intersecting a second top corner of the second end of the twisted plate, wherein the second top corner of the second end is a vertex of the final angle.

20. The twisted plate of claim 13, wherein the first end of a twisted plate has a first height and the second end of the twisted plate has a second height, wherein the second height of the second end of the twisted plate is greater than the first height of the first end of the twisted plate.

* * * * *